United States Patent
Lowney et al.

(10) Patent No.: US 6,324,689 B1
(45) Date of Patent: Nov. 27, 2001

(54) MECHANISM FOR RE-WRITING AN EXECUTABLE HAVING MIXED CODE AND DATA

(75) Inventors: Paul Geoffrey Lowney, Concord; David William Goodwin, Waltham, both of MA (US); Robert Cohn, Salem, NH (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/164,255

(22) Filed: Sep. 30, 1998

(51) Int. Cl.$^7$ .................................................. G06F 9/45

(52) U.S. Cl. .................. 717/9; 717/10; 709/100

(58) Field of Search .............. 717/5, 9, 10; 709/100; 345/346

(56) References Cited

U.S. PATENT DOCUMENTS

| | | | |
|---|---|---|---|
| 5,157,759 | * 10/1992 | Bachenko | 704/266 |
| 5,230,050 | * 7/1993 | Iistuko et al. | 717/7 |
| 5,274,811 | * 12/1993 | Borg et al. | 717/4 |
| 5,375,242 | * 12/1994 | Kumar et al. | 717/7 |
| 5,504,901 | * 4/1996 | Peterson | 717/8 |
| 5,598,560 | * 1/1997 | Bensen | 717/7 |
| 5,680,622 | * 10/1997 | Evan | 717/9 |
| 5,701,489 | * 12/1997 | Bates et al. | 717/5 |
| 5,742,828 | * 4/1998 | Cabady et al. | 717/8 |
| 5,787,287 | * 7/1998 | Bharadwaj | 717/8 |
| 5,802,585 | * 9/1998 | Scales et al. | 711/154 |
| 5,815,720 | * 8/1998 | Buzbee | 717/9 |
| 5,889,999 | * 3/1999 | Breternitz, Jr. et al. | 717/9 |
| 5,920,714 | * 7/1999 | Johnson et al. | 717/1 |
| 5,930,507 | * 7/1999 | Nakahira et al. | 717/5 |
| 5,978,588 | * 11/1999 | Wallace | 717/9 |
| 6,064,818 | * 5/2000 | Beown et al. | 717/9 |
| 6,182,283 | * 1/2001 | Thomson | 717/9 |

OTHER PUBLICATIONS

Consel et al. "Static and dynamic semantics processing", ACM pp 14–24, Aug. 1990.*

Wu et al, "A new framework for debugging globally optimized code", ACM SIGPLAN, pp 181–191, May 1999.*

Quong et al, "Linking program incrementally", ACM TPLS, vol. 13, No. 1, pp 1–20, Jan. 1991.*

Eustace, et. al, "Atom: A Flexible Interface for Building High Performance Program Analysis Tools", WRL Technical Note TN–44, Jul., 1994, pp. 1–23.

Srivastava, et. al, "Atom, A System for Building Customized Program Analysis Tools", Digital Technical Journal, vol. 8 No. 1, 1996, pp. 196–205.

Wilson, et. al, "Delivering Binary Object Modification Tools for Program Analysis and Optimization", Digital Technical Journal, vol. 8 No. 1, 1996, pp. 18–31.

(List continued on next page.)

Primary Examiner—Mark R. Powell
Assistant Examiner—Anil Khatrli
(74) Attorney, Agent, or Firm—Hamilton, Brook, Smith & Reynolds, P.C.

(57) ABSTRACT

A method for permitting software optimization tools, software instrumenting tools and other analysis tools to re-write executables having mixed instructions and data uses a data structure having an entry for each multi-bit word in an executable file. Each entry of the data structure includes a number of flags that are set to identify the type of the multi-bit word in the associated line of the executable file. The types include instruction, data and unclassified. Each entry also includes a flag that indicates that the multi-bit word should not be optimized and a flag indicating that the multi-bit word is a problem branch. The no-optimize and problem branch flags may be used to identify multi-bit words that may be either branch instructions or data, and to ensure that such multi-bit words are not affected by optimization or other rewriting of the executable. In addition, a problem fall through flag is provided to maintain program flow for possible fall through code segments.

22 Claims, 8 Drawing Sheets

OTHER PUBLICATIONS

Sites, et. al, "Binary Translation", Digital Technical Journal, vol. 4 No.1, 1992, pp. 137–152.

Hookway, et. al, "Digital FX!32: Combining Emulation and Binary Translation", Digital Technical Journal, vol. 9 No. 1, 1997, pp. 3–12.

Larus, et. al, "EEL: Machine–Independent Executable Editing", ACM 1995, pp. 291–300.

Romer, et. al, "Instrumentation and Optimization of Win32/Intel Executables Using Etch", USENIX Windows NT Workshop, Aug. 1997, pp. 1–7.

* cited by examiner

| | |
|---|---|
| VISITED | — 45a |
| INSTRUCTION | — 45b |
| DATA | — 45c |
| NO OPTIMIZE | — 45d |
| PROCEDURE DESCRIPTOR BEGIN | — 45e |
| PROCEDURE DESCRIPTOR END | — 45f |
| LDATA ARRAY BEGINS | — 45g |
| LDATA ARRAY ENDS | — 45h |
| REL_HIGHLOW | — 45i |
| REL_HIGHADJ | — 45j |
| REL_LOW | — 45k |
| REL_VALUE | — 45l |
| BSR_TARGET | — 45m |
| BR_TARGET | — 45n |
| JUMP_TARGET | — 45o |
| HANDLER_TARGET | — 45p |
| ESYM TARGET | — 45q |
| IMAGE ENTRY | — 45r |
| PAD | — 45s |
| UNDEFINED OPERATION | — 45t |
| POSSIBLE UNKNOWN BRANCH TARGET | — 45u |
| JUMP ANALYZED | — 45v |
| PROBLEM BRANCH | — 45w |
| PROBLEM BRANCH IGNORED | — 45x |
| PROBLEM FALLTHROUGH | — 45y |

FIG. 4

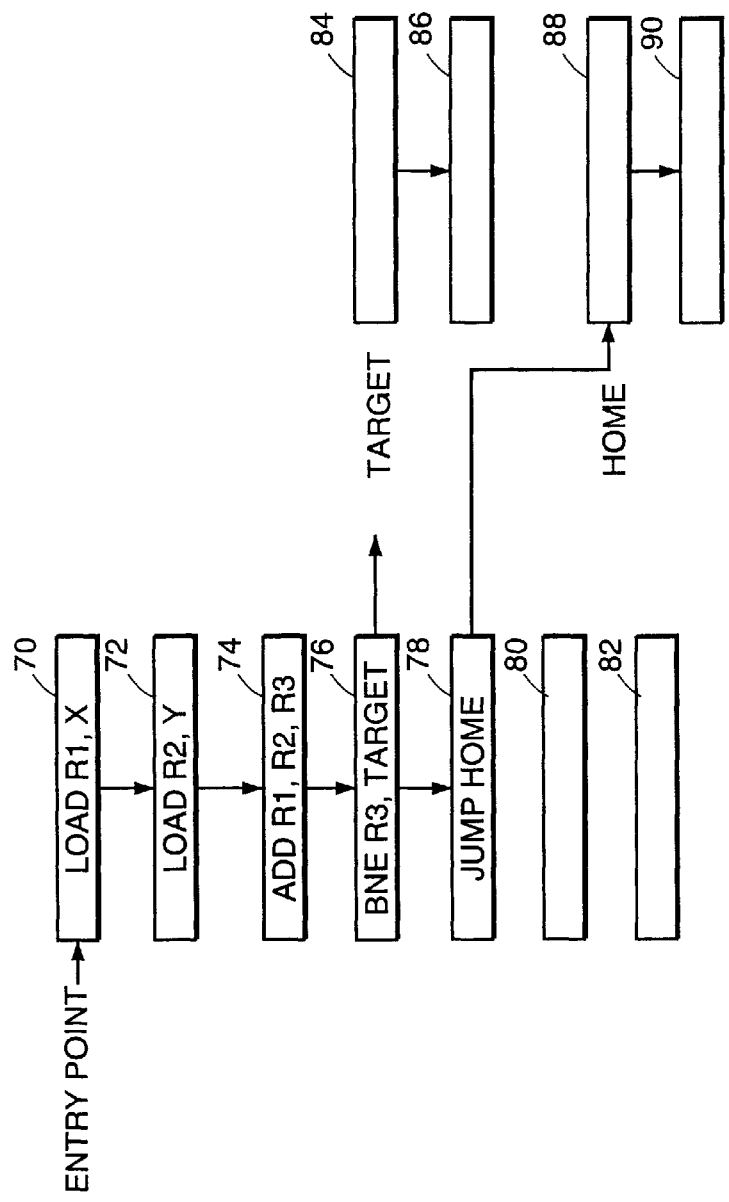

MECHANISM FOR RE-WRITING AN EXECUTABLE HAVING MIXED CODE AND DATA

FIELD OF THE INVENTION

This invention relates generally to the field of computer software and more particularly to software optimization and analysis tools.

BACKGROUND OF THE INVENTION

As is known in the art, computers operate using a combination of hardware and software. The software controls how the computer hardware functions to produce a desired result. The software that is provided on a computer system includes an operating system and may include one or more software applications. The operating system controls the basic operations of the computer hardware and presents a framework for allowing other software applications to interface with the hardware. Known operating systems include the VMS operating system, MS DOS, Windows 95, Windows NT, or UNIX, among others.

Another software application that is often included in the software of the computer system is a compiler. The compiler is a software routine that translates software applications, written in a high level code such as C++, into an executable file capable of being run on the computer hardware. The executable file includes a set of instructions and data for implementing the software application on the computer hardware. The set of instructions comprises instructions from an instruction set of the computer. For example, a reduced instruction set computer (RISC) has an instruction set that includes simple operations, such as load and store operations. In general, the order of instructions in the executable file mirrors the order of instructions in the software application listing; with each instruction of the software application being translated into one or more corresponding instructions from the instruction set of the computer.

Once an executable file of the software application has been generated, the software application may be executed on the computer system. Generally, the executable file is stored in a memory of the computer system, such as main memory, disk drive or other such device. As the software application is executed, portions are moved from an external memory into a local memory referred to as a cache memory. The cache memory is a relatively fast memory that is used for temporary storage of instructions and data that are to be executed on a processor of the computer hardware. By providing fast access to the instructions and data, the cache memory helps to improve the performance of the software application by reducing the delay incurred when retrieving instructions and data from memory.

Each time that an instruction or data is required for operation of the software application, if the instruction or data is not stored in the cache it must be fetched from the memory. Because of the delays associated with retrieving data from memory, it is desirable to ensure that those instructions that are to be executed frequently are stored in the cache.

Optimization tools have been provided to improve the performance of software applications by re-arranging the order of instructions in the executable files to maximize cache usage. Re-arranging the order of the instructions in the executable files may be done to group together frequently executed instructions such that the group may be forwarded to the cache in one operation. Optimization tools may also re-arrange the order of instructions for a variety of other purposes.

One problem encountered by optimization tools is that the executable files provided by different compilers of different operating systems frequently have different formats. Some operating system compilers, such as the Windows NT compiler, interleave instructions and data to ensure that data that is needed by instructions is also moved to the cache when the associated instructions are moved to the cache. By placing data near the instructions, fewer cache accesses need to be made, fewer delays are incurred and the overall performance of applications is increased.

However, because the instructions and data are basically both multi-bit data words, when instructions and data are interleaved it is difficult for the optimization tool to identify which multi-bit data words are instructions capable of being re-arranged. Thus, it is often difficult to optimize executables generated by operating systems that interleave instructions and data.

SUMMARY OF THE INVENTION

A method for permitting, software optimization tools, instrumenting tools and other software analysis devices to re-write executables having, mixed instructions and data uses a data structure having an entry for each multi-bit word in an executable file. Each entry of the data structure includes a number of flags that are set to identify the type of the multi-bit word in the associated line of the executable file. The types include instruction, data and unclassified. Each entry also includes a flag that indicates that the multi-bit word should not be optimized and a flag indicating that the multi-bit word is a branch.

The executable code is iteratively traversed to identify those multi-bit words that are instructions and those multi-bit words that are data. After the traversal there may remain unclassified multi-bit words; i.e., multi-bit words which have not been classified yet as either data or instruction type. A traversal is then made of the unclassified multi-bit words. When an ambiguous multi-bit word is encountered, it is determined whether or not the unclassified multi-bit word is a potential branch instruction. If the multi-bit word is a potential branch, then the number of instructions displacing the potential branch instruction from the target is maintained as a constant. In one embodiment, a region of multi-bit words from the potential branch instruction to the potential branch destination is frozen; i.e., those multi-bit words within the region will have their associated no optimization flag set in the data structure so that the multi-bit word will not be optimized. Freezing the region of instruction preserves flow control and data integrity as will be described in more detail later herein. In an alternative embodiment, instructions within the region may change in order, provided the total displacement from the branch to the target remains constant.

In addition, during the traversal of multi-bit words, when an ambiguous multi-bit word is encountered prior to a series of identified instructions, the ambiguous multi-bit word is marked as a branch instruction having a flow through path to the list of instructions. The ambiguous multi-bit word is marked by asserting the appropriate flag in the associated entry of the data structure. Thus, if the ambiguous multi-bit word is later moved by the optimization tool, a branch will be inserted by the optimization tool back to the series of identified instructions, thereby preserving the flow of operations of the software application.

Therefore, according to one aspect of the invention, a method for re-writing an executable comprising the steps of analyzing a plurality of words in the executable to classify each of the plurality of words as one of either instruction, data or unclassified, storing data representing a classification of each of the plurality of words in the executable in a data structure, and during optimization, selecting words of the executable for re-ordering responsive to the data in the data structure.

According to another aspect of the invention, a computer readable medium having a data structure stored thereon is provided. The data structure comprises a plurality of entries corresponding to a plurality of words in an executable file, with each entry of the data structure further including a flag for indicating whether a word in a corresponding location of the executable tile is an instruction and a flag for indicating whether a word in a corresponding location of the executable file is a data word.

BRIEF DESCRIPTION OF THE DRAWINGS

Reference will now be made to the following drawings, wherein like numbers refer to like elements and wherein:

FIG. 4 illustrates a data structure provided by the present invention to identify types of multi-bit words in the executable file of FIG. 2, where the data structure may be provided by the pre-optimization method of FIG. 3;

FIG. 6 illustrates a control flow graph that may be generated during an instruction analysis phase of the pre-optimization method of FIG. 5;

FIG. 7 illustrates a control flow graph that may be generated during a data analysis phase of the pre-optimization method of FIG. 5;

DESCRIPTION OF ILLUSTRATIVE EMBODIMENTS

Figure 1:
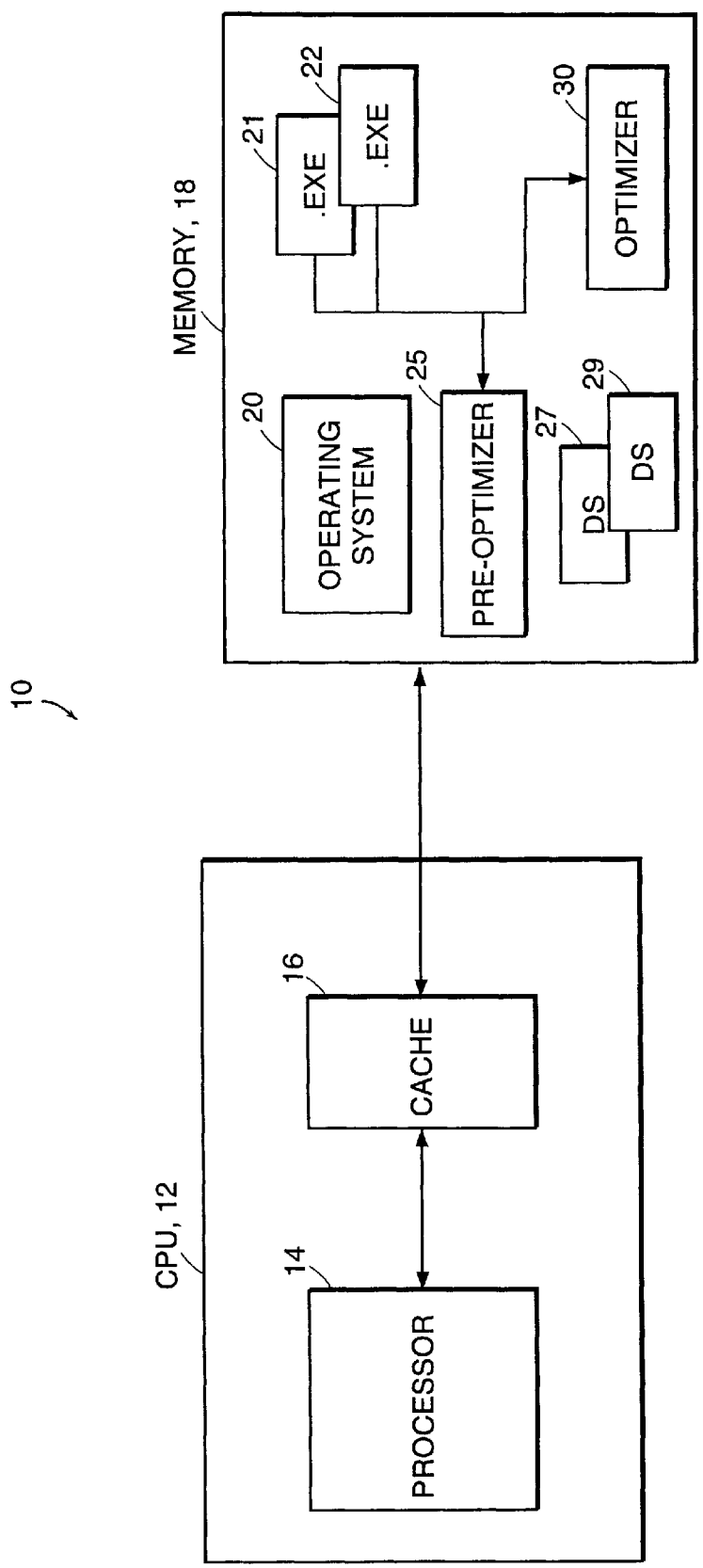
FIG. 1 is a block diagram illustrating a computer system in which the present invention may be utilized.

Referring now to FIG. 1, a computer system 10 in which the present invention may be employed is shown to include a central processing unit (CPU) 12 coupled to a memory 18. The CPU 12 may include a processor 14, such as an Alpha™ processor, Intel processor or the like. The CPU may also include a cache 16, which is a relatively small fast memory for storing data retrieved from the memory 18 for use by the processor 14.

The memory 18 may be, for example, a disk device. For purposes of illustration, software that executes on the computer system 10 is shown stored in the memory 18.

During operation, as instructions and data of the software are executed they are copied into the cache 16 and subsequently forwarded to the processor 14. The software illustrated in FIG. 1 includes an operating system 20 and one or more executable files (shown labeled EXE) 21 and 22. The executable files are software applications that have been translated to operate on the computer system 10. The executable files 21, 22 may have been translated by a compiler routine of the operating system 20 or alternatively may have been provided from an external source in executable form.

In one embodiment, also shown included in memory 18 are pre-optimizer routine 25 and optimizer routine 30. The pre-optimizer routine 25 and optimizer routine 30 operate together to re-write the executables 21 and 22 such that the performance of the associated software application on the computer system is improved. The pre-optimizer of the present invention provides data structures 27 and 29 (labeled as DS in FIG. 1), each of which correspond to respective executables 21 and 22. Although only two executable/data structure pairs are shown in FIG. 1 it should be understood that a data structure may be provided for each executable that is to be optimized. Although conceptually two data structures are shown, in fact the same data structure may be used, with the contents being modified for each associated executable file being optimized.

Figure 2:
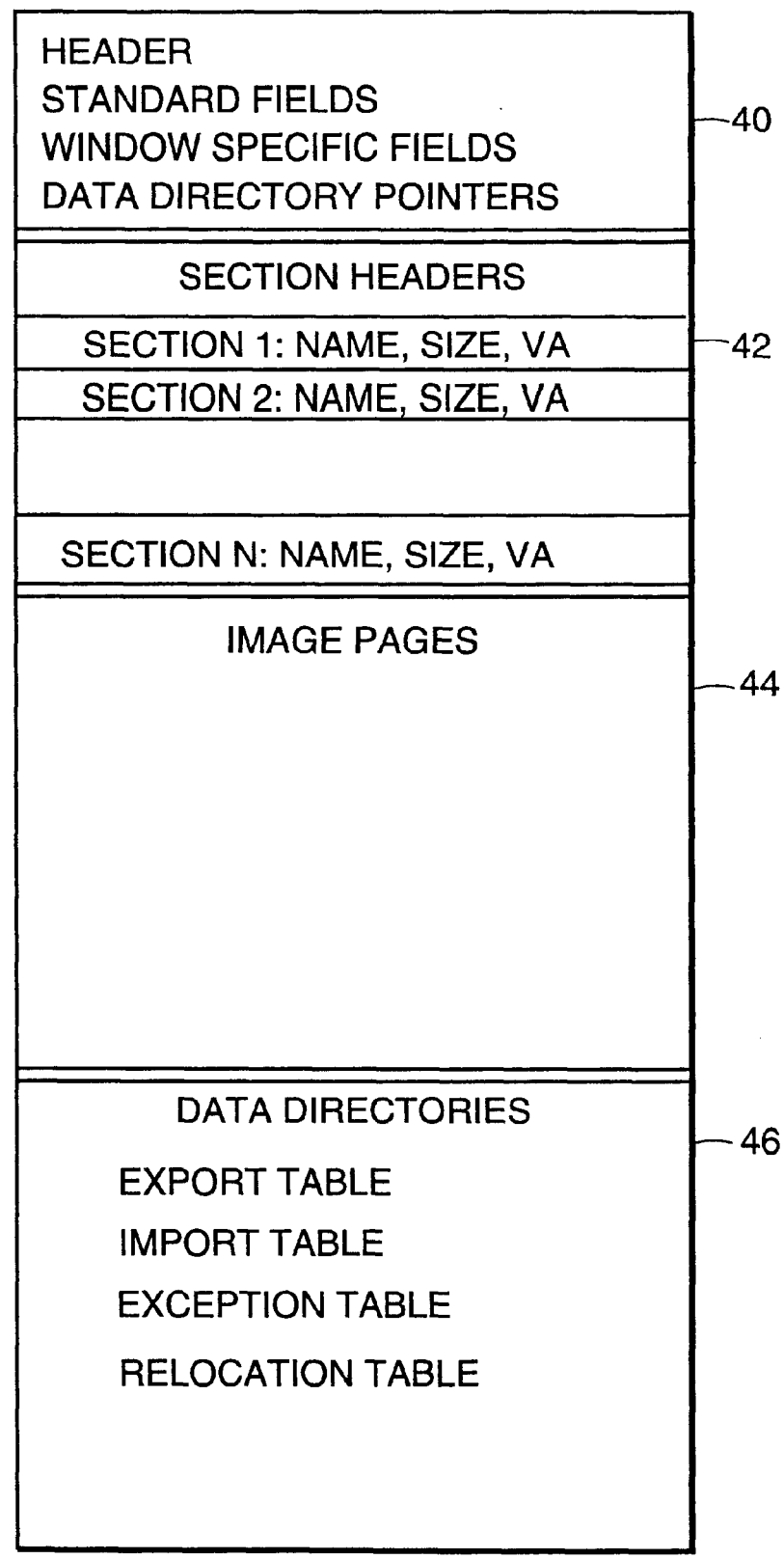
FIG. 2 illustrates a subset of the portions of a typical executable file.

Referring now to FIG. 2, a block diagram illustrating a general layout of an executable file such as executable 21 is shown. The executable file may also be referred to as an image, and the terms will be used herein interchangeably. It should be noted that not all of the portions of the executable file will be described. For purposes of clarity, only those portions that are helpful to understand the operation of the pre-optimization method of the present invention will be described. A thorough description of the organization of on executable file is disclosed in "Microsoft Portable executable and Common Object File Format Specification", Revision 5.0, October 1997, distributed by Microsoft Corporation and incorporated herein by reference.

The first portion of the executable file is a header portion. The header portion includes information describing the image. For example, the header portion may include information identifying what type of machine the image may run on, the number of sections in the image (where each section includes instructions and/or data), and other characteristics of the image. The header of the executable file also includes standard fields, such as fields identifying the state of the image, size of the code section, size of the data section and entry point address. The header of the executable file also includes pointers to various data directories. The data directories are shown as group 46 of the image. Example directories include an export table, import table, exception table and relocation table. The export table includes addresses of functions that are exported from the image for use in other images. The import table includes addresses of functions that imported from other images into the image.

The relocation table has an entry for each absolute address stored in the image. Each entry in the table includes a pointer to the location containing the address, and a type field that describes how to adjust the location if the image is relocated; i.e., moved to a new base address in memory 18. For example, the assumption is that most main images in the NT operating system are loaded starting at address 0x400000. If a function foo is located at address 0x402000, a pointer to function foo in memory will contain the address value 0x402000, and the relocation table will contain an entry for the pointer. If the image is loaded at location 0x50000 instead of 0x400000, the value of the pointer to the function foo must be updated to point to location 0x502000, and the relocation table entry describes how to do this. Thus, the relocation table will describe locations including pointers to all of the instructions in the image. When instructions are moved by the optimizer, the pointers described by the relocation table need to be updated.

The image also includes a group of section headers 42, with each section header associated with one of the sections of the image. A section of the image may be any number of pages of the image, where a page may comprise, for example, 8 K bytes. The section headers each include a name, size of the section and virtual address of the section. Image pages 44 include a number of pages of instructions and/or data apportioned into sections.

In one embodiment, each of the instructions and data that are included in the image 21 are formed from multi-bit words. In one embodiment, 32 bits are used to decode instructions and data. A 32 bit word is hereinafter referred to as longword. It should be understood that, although references will be made to longwords, the present invention is not limited to any particular number of bits for instruction and data encoding.

According to one embodiment of the invention, a pre-optimization tool analyzes the image and provides a data structure having, one entry for each of they longwords in the image. In general, this data structure is used to mark the type of longword as either instruction or data. Particulars of the data structure are described in more detail in FIG. 4. Identifying the types of the longwords either as instruction or data allows an optimization tool to optimize executables having mixed instruction and data format by clearly identifying those longwords that may be re-arranged.

Figure 3:
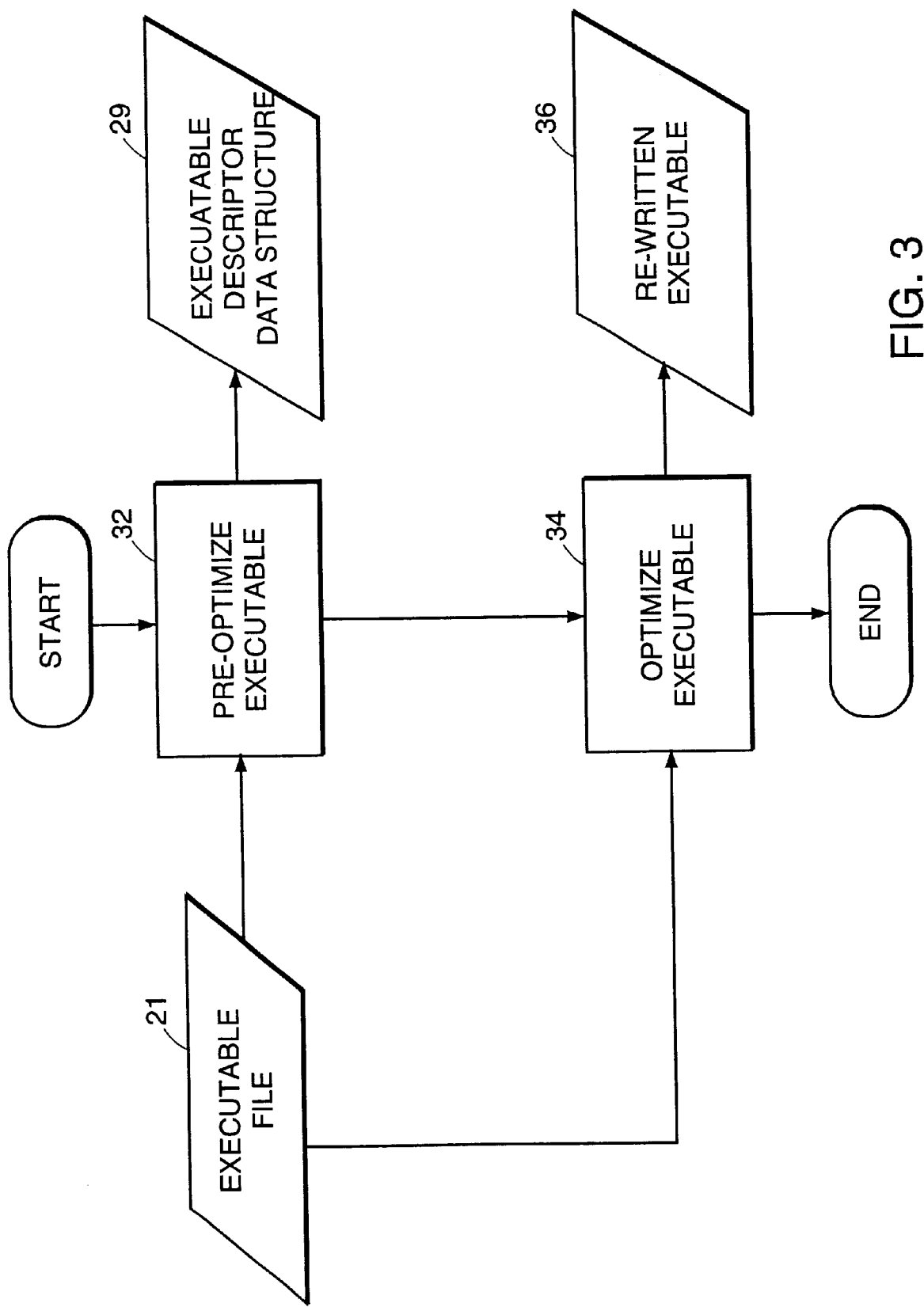
FIG. 3 is a data flow diagram for illustrating how the pre-processing method of the present invention interfaces with optimization software.

Referring now to FIG. 3. a data flow diagram is provided to illustrate how the pre-optimization tool works in conjunction with an optimization tool to re-write executable code. In the data flow diagram of FIG. 3, generated data is represented by trapezoids while functional units are represented as blocks. At step 32 a pre-optimization tool is executed. As described above, the pre-optimization tool analyzes the executable to identify longwords as either Instructions or data. There may be some longwords in the executable file which remain unclassified after analysis and some regions of the executable which the pre-optimization tool has decided should be frozen. The details of how the pre-optimization tool performs its analysis are included below. Suffice it to say that after the analysis is completed, a data structure such as data structure 27 is provided.

At step 34, the optimization or instrumenter routine is executed. An instrumenter tool places a counter at every branch to analyze the branch behavior of the software application. As described above, an optimization tool re-writes the executable to improve the performance of the software application when it is executed on the computer system 10 by re-arranging the instructions in the executable. For example, the number of instructions executed in a frequently executed loop may be reduced by moving some instructions out of the loop. In addition to an optimizer and an instrumenter, the data structure may be used to assist other routines that track the performance and data usage of the image, and therefore the present invention is not limited to the use of the pre-optimization tool with any particular application.

Referring now to FIG. 4, one embodiment of a data structure 29 that may be generated by the pre-optimization tool is shown. The data structure 29 includes a number of flags 45a–45y. Each of the flags identifies a potential characteristic of the associated longword. A number of flags indicate the operating status of the pre-optimization tool with regard to that longword. For example, Visited flag 45a indicates whether the pre-optimization tool has analyzed the associated longword. The flag, Jump analyzed flag 45v indicates that the associated longword is a jump instruction and that the destination of the jump instruction has already been analyzed.

A number of the flags are associated with instructions and indicate the type of instruction of the associated longword. The flags which are associated with instructions are as follows: An Instruction flag 45b marks the longword as an instruction. Procedure descriptor being flag, 45e, Procedure descriptor end flag 45f and Image entry 45r all indicate that the associated longword is an instruction that is either the entry point or exit point of a procedure or image. A Bsr__target flag 45m, Br__target flag 45n, Jump__target flag 45o, Handler target flag 45p, and possible unknown branch target flags 45u are flags that are set if the associated longword is an instruction that is possibly a target of a branch, jump, exception handler, or other control transfer operation.

The Esym target flag 45q indicates that the associated longword may possibly be the target of an external symbol; i.e., the address of a particular longword is exported out of the image. For example, in a shared library, all of the entry points are external symbols, and other images linked against the shared library may jump to them. The Esym target may be either an instruction or data longword.

In addition, a number of flags are associated with data and indicate a type, association or origin of the associated longword data. For example the data flag 45c indicates whether or not the associated longword is data. The Idata array begin flag 45g, the Idata array end flag 45h are used to mark the origin longwords and the end longwords of the arrays that make up the import table. The Rel__highlow flag 45I is used to mark longword data that contains an absolute address.

Other flags include the pad flag 45s, which is set to indicate if the instruction is a is pad instruction (such as a NOP), or if the data is pad data (for alignment purposes), the Undefined operation flag 45t which identifies a longword that has a bit pattern that does not correspond to a valid instruction. A problem fall through flag 45y is used to identify problem fall through paths; i.e., unclassified longwords that are succeeded by a series of one or more instructions. Problem fall throughs will be described in more detail later herein.

All of the above flags may be used to fine tune the re-writing operation of the optimizer. Additional flags that may also be helpful to the specific optimization, instrumentation or analysis tool are within the scope of the invention.

Figure 5:
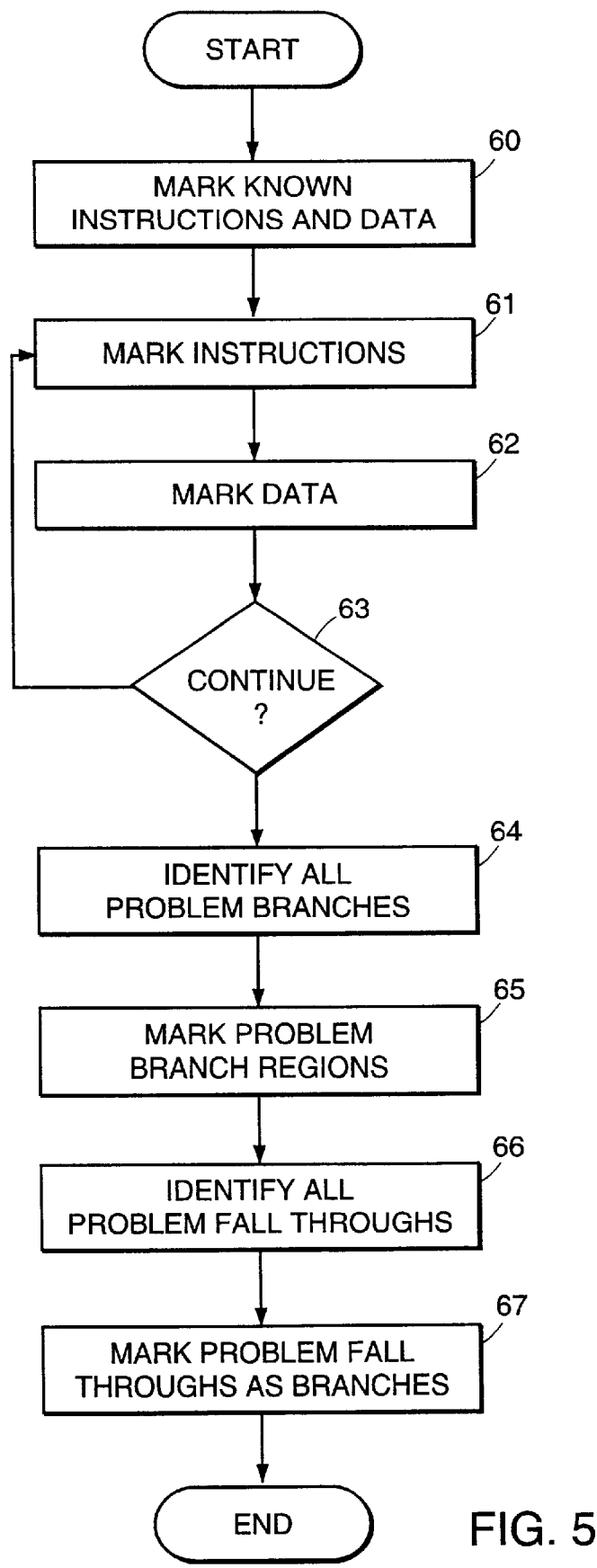
FIG. 5 is a flow diagram of one embodiment of the pre-optimization method of FIG. 3.

Referring now to FIG. 5, a flow diagram illustrating one embodiment of a method of operating the pre-optimization tool will now be described. At step 60, system data structures stored in the executable are analyzed to identify known instructions and data within the image. For example, information in the header file identifying the entry point of the executable may be used to mark the data structure entry of the associated longword as an instruction. The procedure descriptor table includes entry point and exit point addresses to instructions of procedures; therefore, the corresponding flags in the data structure are set for the longwords associated with the addresses in the procedure descriptor table. The procedure descriptor table also includes the entry point address of each exception handler, and the corresponding flags in the data structure are set for the longwords associated with the entry point addresses. In addition, a longword may be classified as data if it has a bit pattern that does not correspond to a valid instruction. For valid programs, the targets of certain relocation types can only be instructions, and the targets of other relocation types can only be data. Therefore, the corresponding flags in the data structure are set for the longwords that are the targets of these relocation types.

Because the entries of the import table and other system tables do not contain instructions, the data structure entries associated with these tables may be set to mark these tables as data. Thus, during the first stage of analysis by the pre-optimization tool, all known longword types are marked in the data structure.

Following the first stage analysis, many of the longwords will remain unclassified. At step 61, the pre-optimization tool begins a flow analysis for the executable file. A flow graph is generated, starting at the entry point and walking forward along all control paths. Each time a longword is encountered in the traversal of the control flow graph, its Visited flag 45a is set. Because an assumption is made that the executable operates correctly, once an instruction has been identified, unless the identified instruction is an instruction which totally changes the flow of code, it can be assured that the longword immediately following the instruction must also be an instruction. Thus, until the flow of instructions is stopped by a return, jump, branch or other control transfer operation, it is assumed that the instructions follow a fall through path.

For each longword which is identified as an instruction because it is encountered in a fall though path and which decodes as a control transfer instruction (jump or branch) the targets of the control transfer instruction are determined. When the target longwords are determined, the Instruction flags 45b are set in the corresponding data structure entries. Additionally, one of the branch target flags 45m and 45n or jump target flag 45o are set.

A portion of an example flow diagram that could be built by analyzing the executable 21 is shown in FIG. 6. The entry point from the header file indicates that longword 70 is the first instruction in the image, in this example a Load instruction, where a value X is loaded into register R1. Starting from longword 70, the next longword in the sequence of the executable is retrieved. Because it is assumed that the software application operates correctly, longword 72 is assumed to be an instruction and the Instruction flag in the data structure entry corresponding to longword 72 is set. For purposes of illustration, longword 72 decodes to a Load instruction, and a value Y is loaded into register R2. Because the Load instruction is not a control transfer instruction, longword 74 must also be an instruction, and the Instruction flag in the data structure entry corresponding to longword 74 is set. In this example, longword 74 decodes to an Add. Because the Add does not change control flow, longword 76 is identified as an instruction. Because longword 74 is not a control transfer instruction, longword 76 is an instruction, and its corresponding Instruction flat, is set in the data structure. In this example, longword 76 is a branch instruction, BNE R3, which conditionally changes the direction of flow depending upon the state of the register R3 to a target destination. The target destination is retrieved from the branch instruction 76, and the longword 84 according to the instruction has its Instruction flag and branch target flag set in the data structure entry. In addition, because the branch instruction 76 has a flow through path, longword 78 is identified as an instruction. In this example, longword 78 is an absolute Jump instruction, which changes the flow of control for the program. The target of the jump is determined and longword 88 is marked as an instruction.

Thus, no inferences may be made at this point as to whether longwords 80 and 82 are instructions or data. At this point, tracing of the first control path (instructions 70–78) continues along the pathway starting at longword 88 (the target of the Jump). The control path continues to be traced until either a longword is encountered that has already been analyzed (which may be determined by examining it's visited flag) or an instruction that decodes as a return or halt instruction is encountered. When any of these stop conditions is met, analysis begins at a first instruction in a next control path, (such as one of the Identified branch target paths). This process continues until all of the longwords have been visited.

Referring back to FIG. 5, once the executable has been analyzed to mark longwords as instructions, it is again analyzed to mark longwords as data. An attempt is made to identify larger contiguous regions of data. For each longword that is identified as a data element at step 60 a linear backwards scan (decreasing addresses) is performed to search for a longword that has already been classified as an instruction or a longword that has an encoding of a control transfer instruction. Each longword encountered in the backward scan operation that has not already been classified and is not a control transfer instruction has its corresponding Data flag 45c in the data structure set. Because it is assumed that the program operates normally, once a data region has been identified, it can be assured that the instruction sequence will not fall through and start executing the data. Thus, a control transfer operation must occur before data is encountered. The backwards search for the control transfer instruction may therefore be used to identify regions of data.

For example, referring now to FIG. 7, assume that longword 92 was identified at step 60 as data. First, a linear backwards analysis of each of longwords 94, 96 and 98 indicates that none of these longword has either been classified (as either instructions or data) and are not control transfer operations. Therefore, the Data flags in the entries of the data structure corresponding to the longwords 94, 96 and 98 are set. However, once longword 99 (a control transfer operation) is encountered, the backwards analysis of this specific path is complete. This analysis is performed for each of the elements identified as data items at step 60.

After the backwards linear analysis has completed, for each of the longwords identified as data at step 60, a forward traversal of the executable is performed. If the successor longword has not been classified, the successor longword is classified as data. The linear forward scan continues until a longword is encountered that has already been classified or until a longword that is a possible target of a control transfer operation is identified. The linear forward scan continues for each data item until all the originally identified data elements have been visited. When all of the data elements have been visited for backwards and forwards linear scan, the data portion of the analysis is complete.

Referring back again to FIG. 5, once the data marking of step 62 is complete, at step 63 it is determined whether to re-execute the instruction marking and data marking steps 61 and 62, respectively. Each pass of the instruction and data marking steps provides information that is helpful to resolve the classification of unclassified longwords. Therefore, it is advantageous to iteratively execute the mark instruction and mark data steps until the number of longwords remaining unclassified becomes relatively constant. Thus, at step 63, a decision will be made to repeat steps 61 and 62 until the number of longwords classified as instructions, the number of longwords classified as data and the number of longwords unclassified are relatively constant on each pass.

At step 64, all of the unclassified longwords are decoded to identify problem branches. A problem branch is a longword that has an opcode portion that decodes to a branch opcode, yet the longword has not been classified as an instruction or as data. It could be that the longword in fact is an instruction. However, it could also be that the longword is merely data having a bit pattern corresponding to a branch instruction.

Problem branches pose a difficulty because no assumption can safely be made as to the classification of the longword. If it is assumed that the longword is data when in fact the longword is a branch, the flow of instructions from the branch may be altered by the optimization tool, causing the software application to execute inaccurately. For example, assume that the longword includes a number of bits that encode as a branch and a number of bits that encode as the offset target for the branch. If it is assumed that the longword is merely data, it the optimization tool later moves either the branch or the branch target, the offset field of the branch instruction will not be updated. As a result the software application will execute erroneously.

If it is assumed that the longword is a branch, when in fact the longword is data, then it will be assumed that the lower data bits indicate an offset or target. If the offset or target is moved, the lower data bits of the longword will be modified. If in fact the longword is data, this modification will change data and adversely affect the software application.

Therefore, in order to ensure that problem branches do not get optimized, the region between the branch instruction and the target(s) of the branch are frozen; i.e., the entire region may be moved by the optimizer but no individual instructions within the region that could effect the branch instruction and target offset should be re-arranged. By freezing this region it can be assured that the displacement between the branch instruction and the branch target remains constant and that the contents of ambiguous longwords are not modified.

Figure 8:
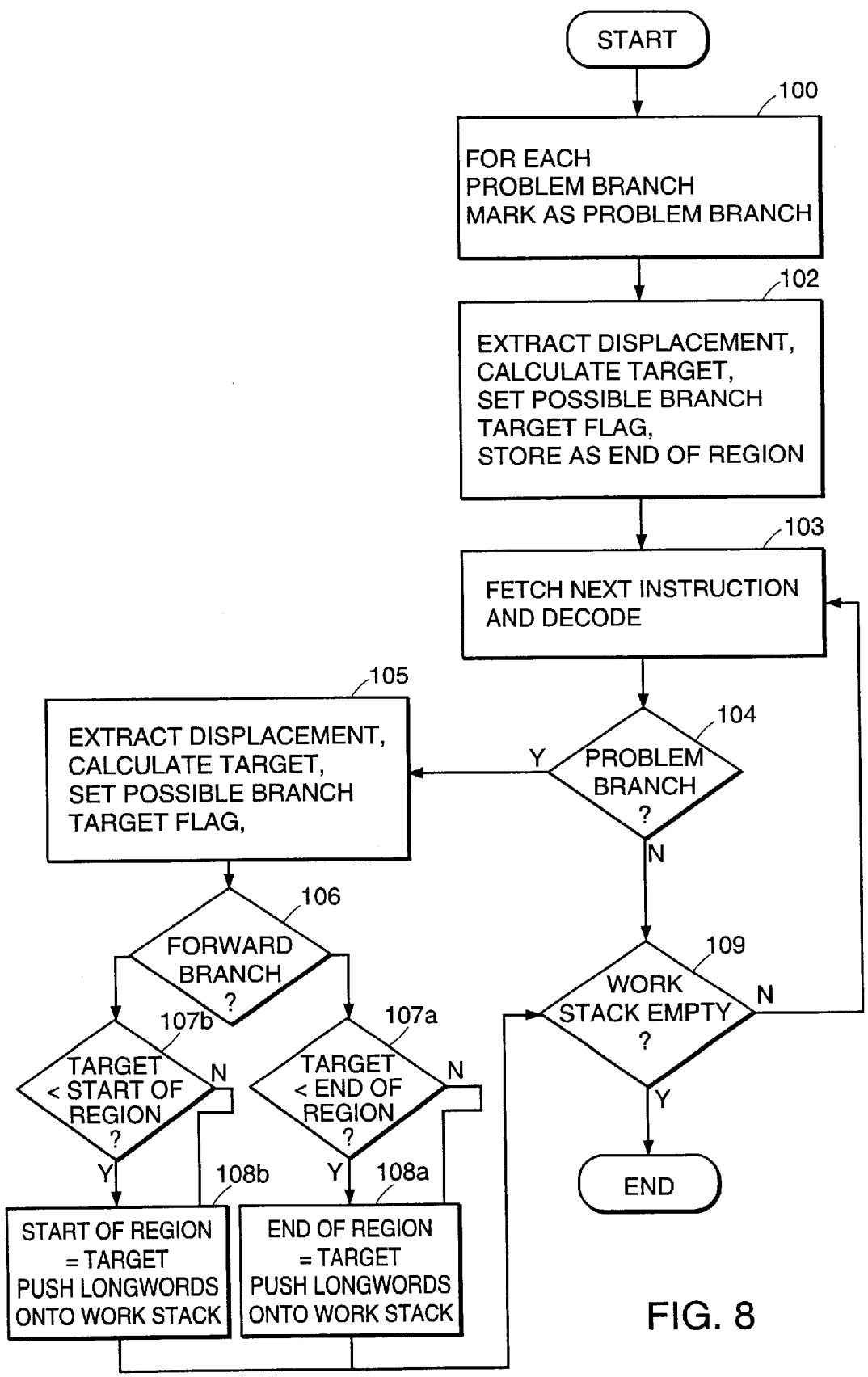
FIG. 8 is a flow diagram illustrating a method for identifying regions of a problem branch.

Referring now to FIG. 8, a method for marking a problem branch region is shown. At step 100, the ambiguous longword is decoded to extract a potential branch displacement value. The displacement value may be positive, indicating a forward branch or negative, indicating a backward branch. Also at step 100, the problem branch flag 45$x$ is set in the entry of the data structure corresponding to the ambiguous longword.

At step 102, the displacement value is added to (or subtracted from) the address of the ambiguous longword to determine the address of the target of the branch. The address of the ambiguous longword and the address of the branch target are compared, the smaller is saved as the Start of Region, and the larger is saved as the End of Region. All the longwords between the Start or Region and End of Region, including the two endpoints, are pushed on stack which we call WORK. Also at step 102, the possible unknown branch target flag 45$u$ and the no-optimize flag 45$d$ are set in the entry of the data structure corresponding to the calculated target longword. At step 103, a longword is popped off the top of the WORK stack. The longword is decoded, and its no-optimize flag 45$d$ is set. At step 104 it is determined whether or not this longword is a problem branch. If this longword is not a problem branch, the process the proceeds to step 109. If this longword is a problem branch, then at step 105 the target is calculated, and the flags are updated.

At step 106, it is determined whether the displacement is positive (indicating a forward branch) or negative (indicating a backwards branch). If it is a forward branch, at step 107$a$ the new target is compared against the End of Region address. If the new target has an address that is sequentially greater than the End of Region address at step 108$a$ the new target address is stored as the End of Region address, and all the longwords between the old End of Region and the new End of Region, including the new End of Region, are pushed onto the WORK stack. The process then proceeds to step 109.

If at step 106 it was determined that the problem branch is a backwards branch, then at step 107$b$ the new target is compared against the Start of Region address. If the new target has an address that is sequentially less than the Start of Region address, at step 108$b$ the new target address is stored as the Start of Region address, and all the longwords between the old Start of Region and the new Start of Region, including the new Start of Region, are pushed onto the WORK stack. The process then proceeds to step 109. Thus, the size of the region is extended to cover the displacements of each problem branch encountered between the original branch instruction and the end of the region. Depending upon the displacements of the branches that are encountered, the region may grow in both the positive and negative directions.

At step 109, it is determined whether the WORK stack is empty. If not, the process returns to step 103 where the next instruction is decoded. Once the WORK stack is empty, the process of defining the region affected by the problem branch is complete.

The result of the problem branch analysis is therefore one or more regions of longwords, each with their no-optimize flag set. When the optimizer attempts to re-write the executable, the identified regions are essentially frozen together, they may be moved as a unit but instructions and/or data may not be removed from the region. Thus, the flags of the data structure may be used to preclude optimization in order to preserve code flow and data integrity.

In an alternative embodiment, a method used to mark problem branch regions includes the steps of marking all problem branch regions (i.e, the problem branch and target) by setting the corresponding flags in the data structure, transitively merging all overlapping ranges to provide a set of non-overlapping problem branch ranges, and then walking over each problem branch range and setting the no_optimize flag for each longword encountered within each range.

In another alternative embodiment, rather than freezing the entire region, information about the Start of region address, End of Region address, problem branch sources and problem branch targets may be used to ensure that a constant displacement is maintained between the problem branches and their targets. With such an arrangement, optimization of instructions within the regions would be permissible provided displacements remained fixed.

The data structure may also be used to mark problem fall throughs to ensure that appropriate steps are taken to preserve instruction flow. A problem fall through is an unclassified longword that precedes a block of known instructions and that does not have the encoding of a unconditional control transfer instruction. If the ambiguous longword is an instruction, then, when the program is executed the program control may fall through to execute the block of instructions. However, because the longword is ambiguous, there must be some way to indicate to the optimizer to maintain the program control flow.

Figure 9:
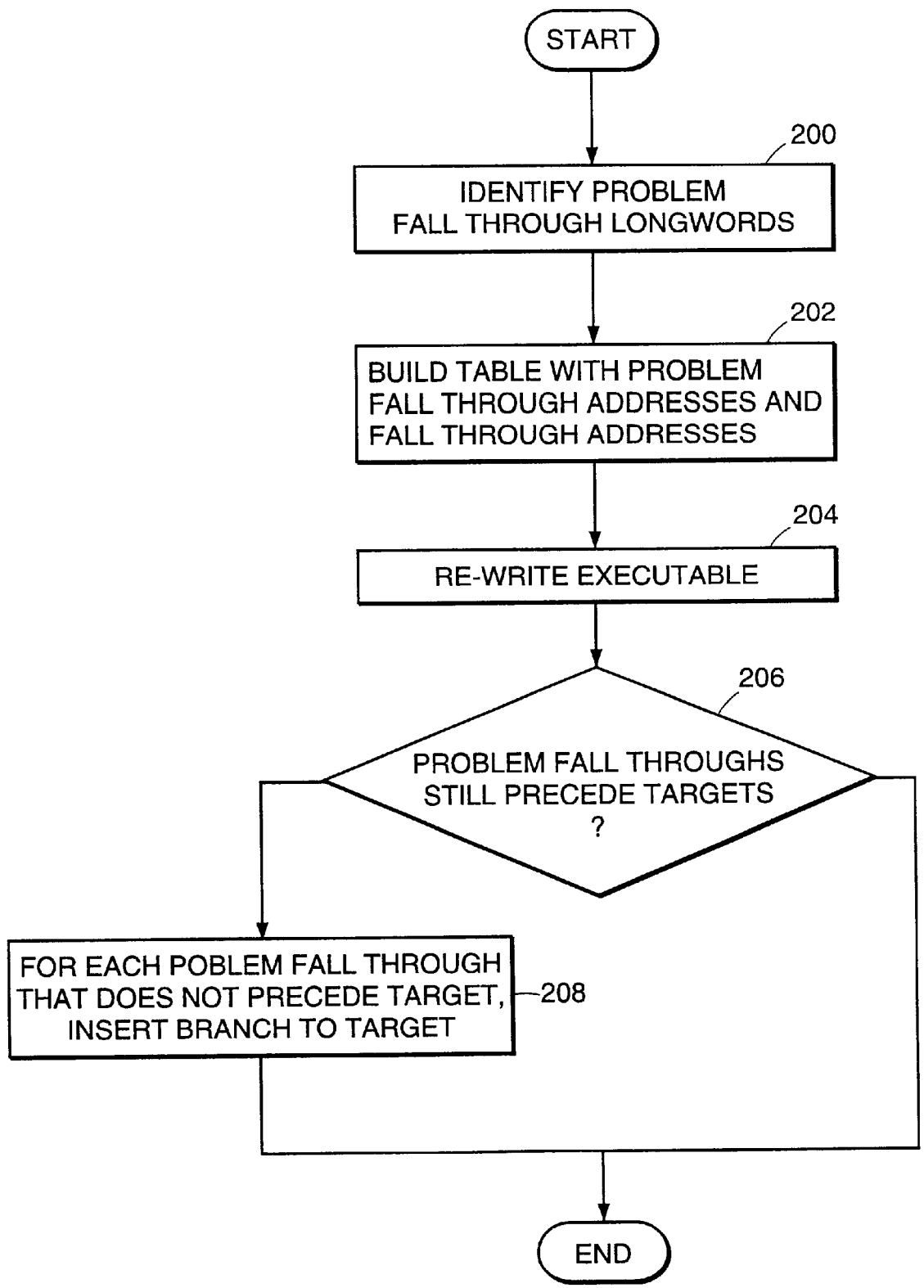
FIG. 9 is a flow diagram for illustrating a method of identifying and handling problem fall throughs.

Referring now to FIG. 9, a flow diagram for illustrating one embodiment of a method of handling problem fall through instructions will now be described. At step 200, each unclassified longword that is not the encoding of an unconditional transfer of control and that precedes a series of one or more instructions is identified as a problem fall through by setting the problem_fall_through flag 45y in its associated entry of the data structure. At step 202, a table is built that contains. for each problem fall through, an instruction object that uniquely identifies the problem fall through and an associated instruction object that uniquely identifies the following instruction (i.e., the fall through target).

At step 204 optimization occurs, and instructions are moved in the executable. At step 206, following optimization, the table is scanned to determine whether each problem fall through still immediately precedes the target. If the problem fall through does not immediately precede the branch, then at step 208 a branch instruction is inserted immediately following the problem fall through, with the branch destination pointing to the address of the fall through target. If it turns out that the ambiguous longword was data, the branch instruction will never be executed (since data is not executed).

Accordingly a method has been provided for pre-optimizing an executable file to prepare the executable file for manipulation by an optimizer, an instrumenter or another software tool. By providing a data structure that identifies characteristics of the associated executable, the same optimization tool may be run a variety of different executable file, regardless of their internal structure.

Having described various embodiments of the invention, it will now become apparent to one of skill in the art that other embodiments incorporating its concepts may be used. It is felt, therefore, that this invention should not be limited to the disclosed embodiment, but rather should be limited only by the spirit and scope of the appended claims.

What is claimed is:

1. A method for re-writing an executable comprising the steps of:

analyzing a plurality of words in the executable to classify each of the plurality of words as one of either instruction, data or unclassified, wherein the step of analyzing includes the step of classifying one of the plurality of words as a problem branch by comparing a plurality of bits of the one of the plurality of words against a set of branch opcodes to determine a match, and, responsive to a match between one of the set of opcodes and the plurality of bits, classifying the one of the plurality of words as a problem branch;

storing data representing a classification of each of the plurality of words in the executable in a data structure; and during re-writing, selecting words of the executable for re-ordering responsive to the data in the data structure.

2. The method according to claim 1, wherein said step of analyzing includes the step of classifying a subset of the plurality of words responsive to data in the executable.

3. The method according to claim 1, wherein the data structure includes a plurality of entries corresponding to the plurality of words in the executable, each entry comprising an instruction flag for indicating whether the associated one of the plurality of words is an instruction, and wherein the step of analyzing includes the step of classifying one of the plurality of words as an instruction by asserting the instruction flag in the corresponding entry of the data structure.

4. The method according to step 3, wherein the step of analyzing includes the step of analyzing the plurality of words to identify instructions by:

selecting a known instruction;

responsive to the known instruction not being a control flow transfer, fetching a next instruction in a sequence of the plurality of words relative to the known instruction;

classifying the next instruction as an instruction by asserting the instruction flag in the corresponding entry of the data structure; and repeating the steps of fetching and classifying until the next instruction is a control transfer instruction.

5. The method according to step 4 further comprising the step of:

decoding the next instruction to determine whether the instruction is a conditional branch instruction;

responsive to the next instruction being a conditional branch instruction, locating each of the target words of the branch instruction from the plurality of words; and classifying each of the target words as instructions by asserting the instruction flags in the corresponding entries of the data structure.

6. The method according to step 4 further comprising the step of:

decoding the next instruction to determine whether the instruction is a jump instruction or an unconditional branch instruction;

responsive to the next instruction being a jump instruction or an unconditional branch instruction, locating the target of the jump instruction or the unconditional branch instruction in the plurality of words; and classifying the target of the jump instruction or an unconditional branch instruction as an instruction by asserting the instruction flag in the corresponding entry of the data structure.

7. The method according to claim 1, wherein the data structure includes a plurality of entries corresponding to the plurality of words in the executable, each entry comprising a data flag for indicating whether the associated one of the plurality of words is a data word, and wherein the step of analyzing includes the step of classifying one of the plurality of words as a data word by asserting the data flag in the corresponding entry of the data structure.

8. The method according to claim 7, wherein the step of analyzing further includes the step of analyzing the plurality of words to identify data words by:

selecting a known data word;

fetching a preceding word in the plurality of words relative to the known data word;

responsive to the preceding not being classified and not decoding as a control transfer instruction, classifying the preceding word as a data word by asserting the data flag in the corresponding entry of the data structure; and repeating the steps of fetching and classifying until the preceding word is classified or decodes as a control transfer instruction.

9. The method according to claim 7, wherein the step of analyzing further includes the step of analyzing the plurality of words to identify data words by:

selecting a known data word;

fetching a succeeding word in the plurality of words relative to the known data word;

responsive to the succeeding word not being classified and not decoding as a possible control transfer target, classifying the succeeding word as a data word by asserting the data flag in the corresponding entry of the data structure; and repeating the steps of fetching and classifying until the preceding word is classified or decodes as a possible control transfer target.

10. The method according to claim 1, wherein the data structure includes a plurality of entries corresponding to the plurality of words in the executable, each entry comprising a problem branch flag for indicating whether the associated one of the plurality of words is a problem branch, and wherein the step of classifying one of the plurality of words as a problem branch includes the step of asserting the problem branch flag in the corresponding entry of the data structure.

11. The method according to claim 10 wherein the step of analyzing further includes the steps of:

for each one of the plurality of words classified as a problem branch:
identifying the target of the problem branch; and
during re-writing allowing longwords in the executable to be rearranged such that the number of longwords displacing the problem branch from the target is maintained as a constant.

12. The method according to claim 10 wherein the entry of the data structure further includes a no-optimize flag for indicating that the one of the plurality of words associated with the entry should not be optimized, wherein step of analyzing further includes the steps of:

for each one of the plurality of words classified as a problem branch:
identifying a region of longwords associated with the problem branch; and
freezing the order of longwords in the region identified as associated with the problem branch by setting the no_optimize flag in the data structure entry associated with each of the longwords in the region.

13. The method of claim 12, wherein the step of identifying the region further comprises the steps of, for each one of the plurality of words classified as a problem branch:

setting the problem branch as a start of region;
calculating a target for the problem branch;
designating the target as an end of region; and
fetching each one of the plurality of words between the end of region and the problem branch.

14. The method according to claim 13 wherein the step of identifying the region further includes the steps of, for each one of the plurality of words classified as a problem branch:

decoding each one of the plurality fetched words to determine if the fetched word is a problem branch;
responsive to the fetched word being a problem branch, determining whether the problem branch is a forward branch or a backward branch;
responsive to the problem branch being a forward branch, comparing the target of the fetched problem branch against the end of region address and conditionally setting the end of region to equal the target of the fetched problem branch responsive to the fetched target branch being greater than the end of region; and
responsive to the problem branch being a backward branch, comparing the target of the fetched problem branch against the start of region address and conditionally setting the start of region to equal the target of the fetched problem branch responsive to the fetched target branch being less than the end of region.

15. The method according to claim 12, wherein the step of freezing further comprises the step of:

asserting the no_optimize flag in the entry of the data structure corresponding to each longword in the region.

16. The method according to claim 1, wherein the data structure includes a plurality of entries corresponding to the plurality of words in the executable, each entry comprising a problem fall through flag for indicating whether the associated one of the plurality of words is a problem fall through, and wherein the step of analyzing includes the step of identifying problem fall throughs and setting the problem fall through flag to mark a possible fall through instruction path.

17. The method according to claim 16, wherein the step of identifying problem fall throughs further comprises the steps of:

for each unclassified longword of the plurality of words that is followed by an instruction:
setting the problem fall through flag in the entry of the data structure corresponding to each unclassified longword; and
storing, in a table, an object that uniquely identifies the first unclassified longword and a second object that uniquely identifies the instruction following the unclassified longword.

18. The method according to claim 17, further comprising the step of, during re-writing:

for each pair of objects in the table, comparing the updated address of the first object with the updated address of the second object;
responsive to the updated address of the second object not being the immediate successor of the updated address of the first object, inserting a branch instruction after the unclassified longword, the branch instruction having a target address corresponding to the updated second address in the table entry associated with the unclassified longword.

19. A computer readable medium having a data structure stored thereon, the data structure comprising a plurality of entries corresponding to a plurality of words in an executable file, with each entry of the data structure further comprising:

a flag for indicating whether a word in a corresponding location of the executable file is an instruction;
a flag for indicating whether a word in a corresponding location of the executable file is a problem fall through; and
a flag for indicating whether a word in a corresponding location of the executable file is a data word.

20. The computer readable medium of claim 19, wherein each entry of the data structure further comprises:

a flag for indicating whether a word in a corresponding location of the executable file is a problem branch.

21. The computer readable medium of claim 19, wherein each entry of the data structure further comprises:

a flag for indicating whether a word in a corresponding location of the executable file should not be optimized.

22. The computer readable medium of claim 21, wherein each entry of the data structure further comprises:

a flag for indicating whether a word in a corresponding location of the executable file is a problem fall through.

* * * * *